July 1, 1941.  H. R. GRAYBILL  2,247,632
ANIMAL TRAP
Filed Dec. 15, 1939  3 Sheets-Sheet 1

INVENTOR
Hershey Roy Graybill
BY
ATTORNEY

July 1, 1941.  H. R. GRAYBILL  2,247,632
ANIMAL TRAP
Filed Dec. 15, 1939  3 Sheets-Sheet 2
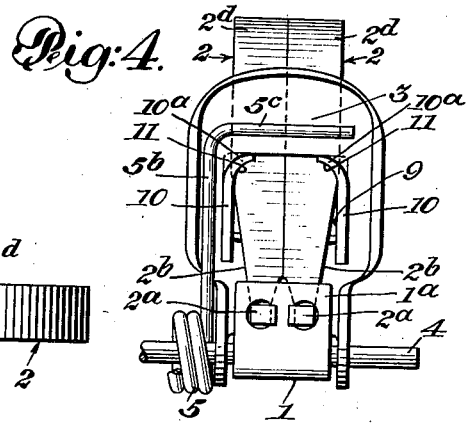
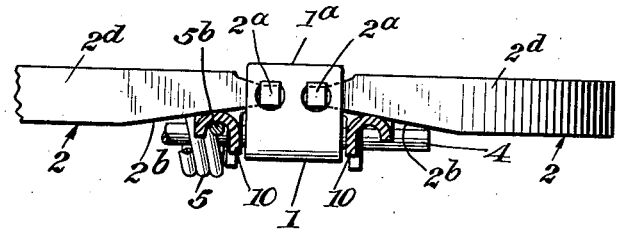
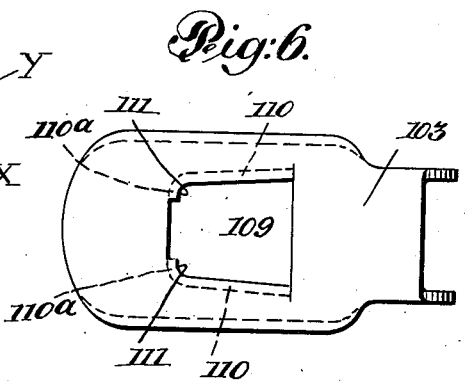
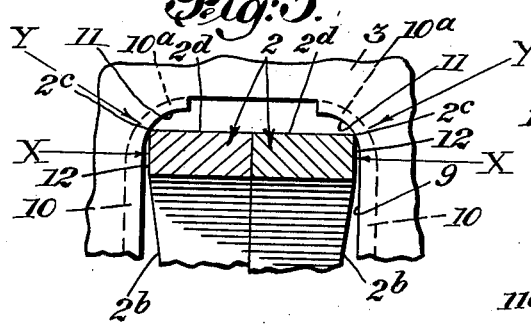
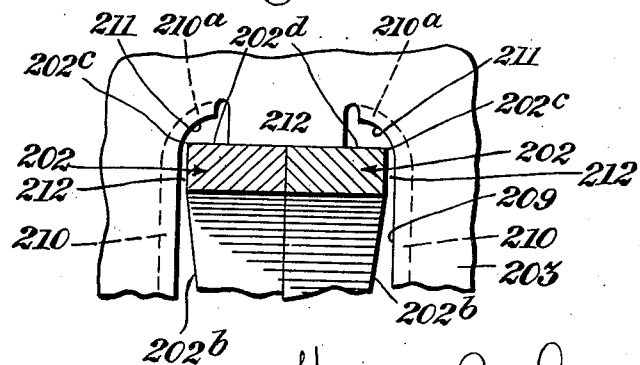
INVENTOR
Hershey Roy Graybill
BY Louis Prevost Whitaker
ATTORNEY July 1, 1941.　　H. R. GRAYBILL　　2,247,632
ANIMAL TRAP
Filed Dec. 15, 1939　　3 Sheets-Sheet 3

INVENTOR
Hershey Roy Graybill
BY
Louis Trevor Whitaker
ATTORNEY

Patented July 1, 1941

2,247,632

UNITED STATES PATENT OFFICE 2,247,632

ANIMAL TRAP

Hershey Roy Graybill, Manheim, Pa., assignor to Animal Trap Company of America, Lititz, Pa., a corporation of Pennsylvania Application December 15, 1939, Serial No. 309,365

9 Claims. (Cl. 43—88)

My invention consists in the novel features hereinafter described, reference being had to the accompanying drawings which show one form of trap embodying my invention and a slight modification thereof, selected by me for purposes of illustration, said invention being fully disclosed in the following description and claims.

In the manufacture of steel traps, a spring actuated pivoted closing arm or lever having an aperture embracing the usually tapered end portions of the pivoted jaws, is frequently used at one, or in some instances at both ends of the jaws for closing the jaws when the trap is sprung. It has been customary to provide the apertures of the said closing arms with downwardly extending flanges, extending parallel to each other along the opposite longitudinal sides of the aperture and formed by bending portions of the metal of the closing arm, which is preferably and usually formed from sheet metal, perpendicular to the plane of the body of the closing arm, said flanges terminating abruptly adjacent to the opposite ends of said aperture. In such constructions when the trap is sprung the closing arm acting under the influence of its spring raises the engaged portions of the jaws, swinging them upwardly in opposite directions to bring the jaws together, the opposite edges of the closing aperture riding up the oppositely inclined outer edges of the jaws and producing a wedging action. The inclination of the outer faces of the jaws when in substantially vertical position, to the vertical plane of movement of the opposite edges of the closing aperture is very slight. At the time this wedging action takes place, it causes the opposite edges of the closing aperture to exert inward pressure in opposite directions, or at an angle of 180° against the oppositely inclined faces or edges of the jaws in directions substantially parallel to the axis of the closing arm. If this engagement between the parallel edges of the closing aperture and the inclined edges of the jaws is permitted to continue until arrested by the jaws coming into contact with each other, that is to say with nothing between them, a jamming or wedging action will result which will make it extremely difficult to depress the closing arm for the purpose of releasing the jaws and resetting the trap. This jamming of the jaws between the parallel sides or edges of the closing aperture is greatly aggravated where the traps have been stored for a considerable time and the contacting surfaces of the jaws and closing arm have, as frequently happens, rusted together.

It has been proposed to provide the outer inclined edges of the jaws with shoulders to act as stops to limit the upward movement of the closing arm. This is objectionable for the reason that, to form the jaws with shoulders, produces more waste of material and increases the cost of the traps.

My present invention is directed to the provision of means for preventing the jamming action above referred to without forming the objectionable shoulders on the jaws. To this end I provide the closing arm with a closing aperture having its opposite and preferably parallel edges or flanges which engage the jaws with opposite inwardly extending portions, preferably curved, at their outer ends, which gradually narrow the aperture at that end. The closing arm is mounted on a pivot, the axis of which is not concentric with the curvature of the portion of the jaws engaged by the closing aperture, and the construction is such that the said edges will be engaged by the jaws at points shifting progressively toward the outer end of the aperture, and including the said inwardly curved portions as the closing arm acts to close the jaws. The effect of this construction is to bring the jaws into contact with the inwardly extending preferably curved portions of said lateral edges or flanges of the closing aperture before the jaws are brought completely together, so that when the jaws meet, the closing arm is arrested by said curved portions at a point on the jaws where their combined width is slightly less than the distance between the straight lateral portions or flanges of the aperture. This changes the direction of pressure of the closing arm on the jaws, so that, instead of being exerted in opposite directions parallel to its axis by the parallel portions of the aperture toward the sides of the jaws, at an angle of 180° the one from the other, it is applied by the curved portions in directions between parallel and perpendicular to the axis, substantially toward the outer corners of the jaws. In other words, the angle between such directions of pressure will be less than 180°, and at the same time there will be a slight space between the lateral exterior edges of the jaws and the lateral edges or flanges of the closing aperture.

This construction has been found to practically eliminate the possibility of the trap jamming when closed, as the slightest movement of the closing lever downwardly toward the set position will cause the inwardly curved portions of the closing aperture to move away from the jaws by reason of the fact that their arc of movement is eccentric to the curvature of the jaws at that point, and as before stated, there is a clear space between the outer lateral edges of the jaws and the adjacent edges of the closing aperture, so that the jaws are instantly released. Furthermore, with this construction the wear of the parts which are in engagement in the completely closed position of the trap will be very slight and would have the effect merely of shifting the direction of pressure more and more toward planes perpendicular to the axis of the closing arm, so that the wear of the parts cannot defeat the purpose of my invention and cause jamming.

In carrying my invention into effect, where the closing aperture of the closing arm is provided, as it usually is, with flanges extending along its lateral edges, I extend these flanges around the previously described inwardly extending curved edges of the aperture at its outer end, at the same time tapering the vertical height of these curved portions of the flanges until they merge into the lower face of the closing arm, the curved portions of these flanges serving to reinforce the flanges and prevent them from spreading apart at their outer edges.

In some instances I may supplement the construction previously described in the case of large sized traps by providing a projection at the outer end of the aperture in the closing arm between the oppositely and inwardly curved portions of the lateral flanges to engage the outer surfaces of the jaws and serve as a positive stop for the closing arm when the trap is sprung empty, thus preventing unnecessary wear of the inwardly curved portions of said edges or flanges, and the engaged portions of the jaws.

Referring to the said drawings,

Fig. 3 is a detail sectional view showing the jaws in set position and one of the closing arms in section.

Fig. 4 is a partial end elevation of the trap in released position.

Fig. 5 is a section of a portion of the trap as it would appear if in released position, and the section were made on line 5—5 of Fig. 2.

Fig. 6 is a detail of a closing arm showing a slightly modified construction.

Fig. 7 is a detail sectional view showing a portion of a closing arm and jaws in released position, and illustrating another slight modification.

Figure 1:
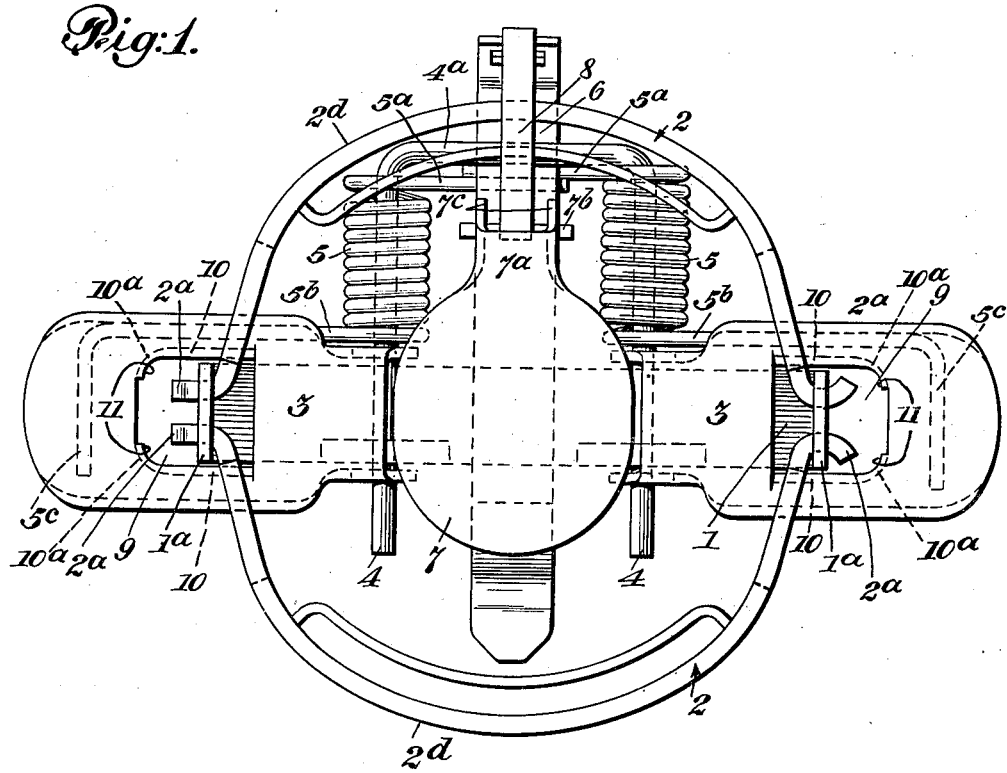
Fig. 1 is a plan view of a trap provided with a pair of oppositely acting closing arms for closing the jaws and having my invention embodied therein, the trap being shown in set position.

Referring to the drawings, 1 represents the base or frame of the trap having upturned portions 1a at its opposite ends, provided with pivot apertures to receive the pivotal portions 2a of the jaws 2, 2 in the usual manner. 3 represents one of the closing arms, of which there are two shown in this particular trap, it being understood that the particular details of the trap are not essential elements of my invention, which may be embodied in traps of different type having pivoted spring actuated closing arms. In this instance each closing arm is pivotally mounted on a pivot shaft 4, extending through portions of the main frame 1, and provided each with a spring coil 5 for operating the adjacent closing arms. In this particular trap the pivot shafts 4 are connected by a crossbar 4a which is supported by the usual cross 6, secured to the main frame in any desired manner, but this is unimportant.

Each of the springs 5 is provided with an arm 5a at its outer end engaging the cross, and an actuating arm 5b at its opposite end having a rectangular bent portion 5c, said arm and bent portion 5c engaging the under side of the adjacent closing arm 3 to actuate it in a direction to close the jaws. 7 represents the usual pan, provided with a shank 7a, pivotally connected with the cross at 7b, in this instance by downwardly extending ears 7c. The portion of the shank 7a between the ears 7c forms the trigger of the trap, and is engaged in a well known manner with a latch 8 adapted to lie over one of the jaws 2, as shown in Fig. 1, and engage the trigger when the trap is set. As before stated, the particular details of this trap form no part of my present invention.

Figure 2:
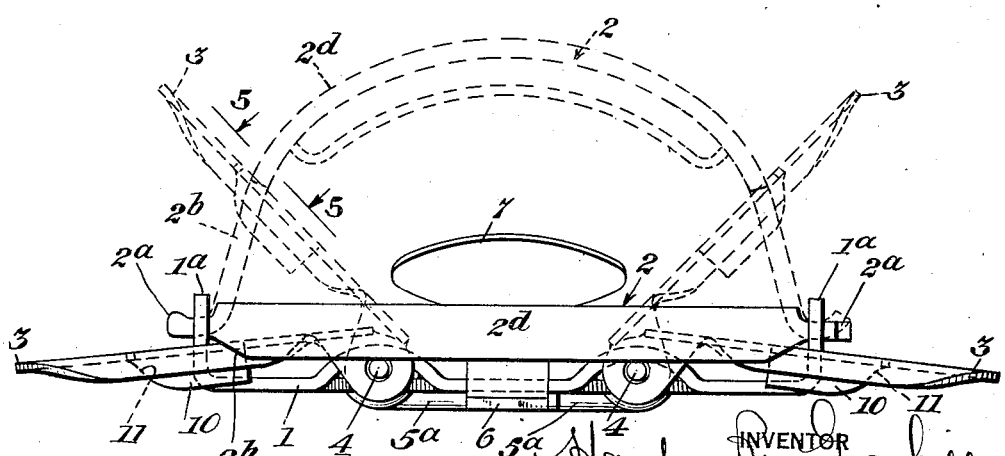
Fig. 2 is a side elevation of the trap, showing in dotted lines the positions of the closing arms, and jaws in sprung or released position.
Figure 8:
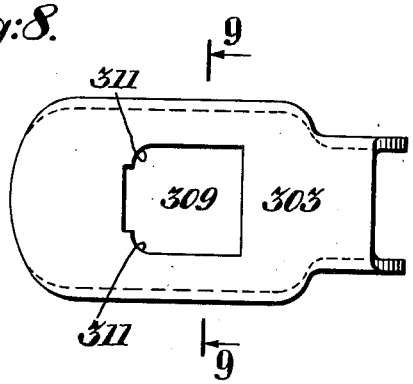
Fig. 8 is a view similar to Fig. 6 showing another modified form of closing arm in which the lateral flanges on opposite sides of the closing aperture are omitted.

Each of the closing arms 3 is provided with an aperture indicated at 9, which is adapted to surround the adjacent upturned portion 1a of the frame and engage the end portions of the jaws pivoted in said upturned portion. The portions of the jaws adjacent to their pivotal connections are preferably slightly tapered at their outer edges, as indicated best at 2b in Fig. 3. The lateral edges of the closing aperture 9 in each of the closing arms are drifted or swaged to provide lateral flanges, indicated at 10, 10, and said apertures 9, as best shown in Fig. 4 are provided adjacent to their outer ends with inwardly curved portions 11. The flanges 10, preferably have their end portions curved to follow the said inwardly curved edges of the apertures 9, and the curved portions of these flanges 10, indicated at 10a, have their lower faces inclined or tapered upwardly so as to substantially merge in the plane of the lower face of the closing arm. While I prefer to provide the closing arm with the flanges 10, 10a, these flanges may be omitted as shown in Fig. 8 if desired. The combined width of the jaws 2, 2 at the point where the closing arm comes to rest, as shown in Fig. 5, is slightly less than the width of the closing aperture 9, and much wider than the distance between the terminal inwardly curved portions 11 of the closing aperture or the inwardly curved portions 10a of flanges 10, the construction being such that when the closing arm is released from the set position, indicated in Figs. 1, 2 and 3, and rises under the influence of its actuating spring, the inner lateral edges of the closing aperture, which move in planes substantially at right angles with the pivot shaft 4, will engage the outer tapered edges 2b, 2b of the jaws to close them, and as they close, will apply the force of the spring to the jaws in opposite directions substantially parallel to the axis of the closing arm as indicated by the arrows $x$, $x$ in Fig. 5, said directions being therefore at an angle of 180° to each other, as indicated by the arrows $x$, $x$. These engaged portions of the jaws, as shown in Fig. 2, for example, are curved eccentrically with respect to the pivot shaft 4 of the closing arm, thus producing an outward sliding engagement between the said tapered portions 2b of the jaws and the inner faces of the flanges 10 of the closing arm, in a direction outwardly toward the inwardly extending curved portions 11 of the closing aperture, and these inwardly curved portions are so located that when the closing arm reaches a position to bring the jaws 2, 2 into contact with each other the jaws will have come into engagement with said inwardly curved portions 11, as clearly illustrated in Fig. 5.

As a result of this construction, and as clearly illustrated in Fig. 5, a space, indicated at 12, occurs between the lateral outer edges of the jaws and the lateral edges or flanges of the closing aperture and the pressure exerted on the jaws by the inwardly curved portions of the edges or flanges of the closing aperture will have shifted toward directions perpendicular to the axis of the closing arm to a greater or less extent, as indicated by the arrows y, y in said figure.

It follows, therefore, that when it is desired to set the trap the slightest movement of the closing arm downward will carry the inwardly curved portions of the closing aperture outward away from the jaws, by reason of the fact that the movement of the arm is eccentric to the curvature of the jaws as before described, and as there is a space 12 at each side of the jaws, they are instantly freed and no jamming effect can be produced.

Another advantage of having the outer ends of the edges of the closing apertures and its flanges curved towards each other is that it will allow for variations in the manufacture of the closing levers and of the jaws, which often occur in mass production, so that if the jaws should be slightly narrower than the standard width at the point where the lever comes to rest upon them, or if the aperture in the closing lever should be slightly wider than standard, the trap will still function perfectly, because in either case the jaws will contact the edges of the closing flanges thereof a little farther around the curved portions, but there will still be sufficient lateral pressure to hold them tightly together, whereas in the case of such variations in a trap having a lever with only the straight side flanges on the aperture, the outer end of the aperture may strike the outer faces of the jaws so as to stop the lever in a position where the side flanges will not exert sufficient lateral pressure to grip them tightly or will not contact them at all.

This contact, due to the change in pressure, will be such as to prevent the possibility of the closing arms jamming on the jaws, and this is true even though the trap, by exposure to atmosphere, has rusted at these contacting portions. Consequently, the trap can be very readily set under any and all conditions, as previously stated.

It is desirable to so construct the parts that the corner portions 2c of the jaws will come into contact with the curved portions 11 of the closing aperture, or the integral portions 10a of the flanges 10, as closely as possible to the points where the said curved portions unite with the straight lateral portions so as to insure sufficient lateral pressure to grip the jaws securely.

In addition to making it practically impossible for the closing arm to jam, the formation of the inwardly curved portions 10a of the flanges 10 serves an additional purpose in acting as a brace to connect the outer ends of the longitudinal portions of the flanges 10 with the body portion of the closing arm, thereby reinforcing the flanges 10 and preventing any tendency thereof to spread apart.

In some instances I find it desirable to form the lateral edges of the aperture in the closing arm, and the flanges thereof if present, in such a manner that they are inclined toward each other in a direction longitudinally of the closing arm, as indicated in Fig. 6, in which the corresponding parts are given the same reference numerals with the addition of 100. In this instance the lateral edges of the closing aperture and their flanges 110 approach each other gradually toward the outer end of the closing arm 103. The outer ends of the flanges 110 connected by portions 111, the lower faces of which are inclined or tapered, are connected with the body of the closing arm so as to stiffen and reinforce the flanges 110, but the inwardly curved portions of the edges of the closing arm or its flanges may be substantially omitted. In this case, likewise, when the closing arm reaches its outermost position, in the released position of the trap, the outer edges of the tapered portions of the jaws will have shifted their positions outwardly toward the outer end of the closing aperture 109, so as to bring about the engagement of the outer portions of the edges of the closing aperture or its flanges 110 with the outer and upper corners of the jaws, and shifting the directions of pressure toward the perpendicular with respect to the axis of the closing arm, to a greater or less extent, and at less than 180° with respect to each other, thus preventing jamming.

In Fig. 7, in which corresponding parts are given the same reference numerals with the addition of 200, I have shown a portion of the closing arm constructed as indicated in Figs. 1 to 5 inclusive, and operating in exactly the same manner, but in this instance I have shown the outer end of the closing aperture 209 in the closing arm 203 provided with an inwardly extending stop or projection 212. This stop lug is of such length as to contact the outer faces of the jaws 202, before the jaws are engaged by the curved portions of the edges of the closing aperture with sufficient force to stop the closing arm, when the jaws are not separated slightly by the leg of an animal as hereinbefore stated. This positive stop prevents unnecessary wear on the engaging portions of the closing arm and jaws when the trap is sprung empty.

I prefer to confine the use of this projection 212 to traps for larger animals, in which case the jaws are always held so far apart by the leg of the animal that this projection could not possibly come into action in such a manner as to permit the animal to escape, which might be the case with traps for smaller animals where especially the jaws are closed upon an exceedingly slender portion of the foot or other part of the animal.

Furthermore, in such traps for the smaller animals less powerful springs are used than in traps for the larger animals, and the dangers of injury to such smaller traps by wear of the engaged portions of the closing arm and jaws when they are closed empty are very much less.

Figure 9:
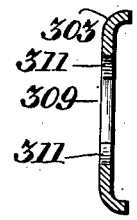
Fig. 9 is a section on line 9—9 of Fig. 8.

In Figs. 8 and 9, in which corresponding parts are given the same reference numerals with the addition of 300, I have shown a closing arm similar to that shown in Figs. 1 and 2, except that the closing aperture 309 is not provided on its lower side with a depending flange surrounding the edges of the aperture as in the forms previously described. In these figures, the closing arm 303 is formed in the same general shape as previously shown and described, and may be provided adjacent to its exterior side edges with stiffening flanges.

The lateral edges of the aperture 309, however, are provided adjacent to the outer end of the aperture with the inwardly curved portions indicated at 311, to be engaged by the upper outer corners of the jaws in the manner previously described for the purpose of changing the direction of pressure exerted by the closing arm on the jaws from a direct lateral pressure in a plane substantially parallel to the axis of the closing arm on each jaw to a pressure at a greater or less angle to said axis on one jaw at an angle of less than 180° to that on the other, for the purpose of preventing jamming. I prefer to provide the lateral portions and curved portions of the closing aperture with the flanges previously described, as it enables me to form the closing arm of lighter material than could otherwise be used.

Figure 10:
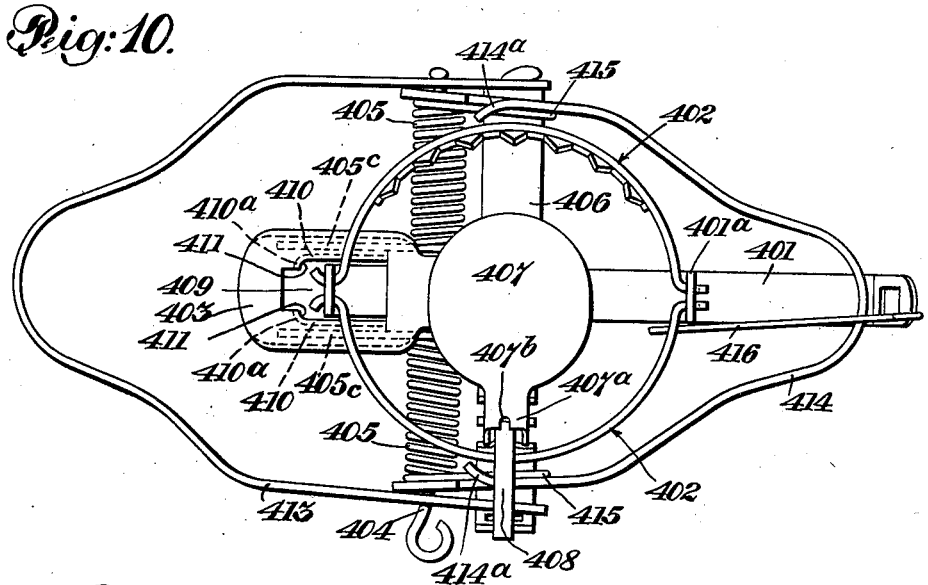
Fig. 10 is a plan view of a two trigger trap having my invention embodied therein.
Figure 11:
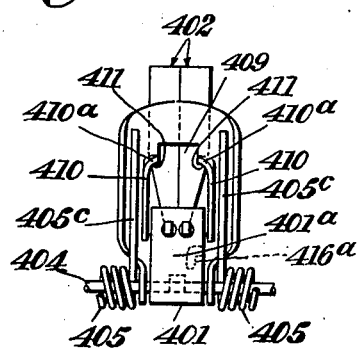
Fig. 11 is a detail view similar to Fig. 4 of a portion of the trap shown in Fig. 10 showing the under face of the closing arm in released position and adjacent parts.

In Figs. 10 and 11, in which corresponding parts are given the same numerals with the addition of 400, I have illustrated this invention applied to a trap having two sets of jaws. In these figures 401 represents the main frame provided with a cross 406, the main frame carrying the pivoted main jaws 402 and being provided with a closing arm 403, having the closing aperture 409 constructed substantially as illustrated in Figs. 1 to 5 inclusive, the lateral edges of the closing aperture 409 being provided with a curved inwardly extending portion 411, and said edges being provided with the downwardly extending flanges 410 terminating at their outer ends with the curved portions 410a, conforming to the curvature of the edges 411 and merging into the bottom face of the closing arm, as previously described and as clearly shown in Fig. 11. In this trap the cross 406 is provided with a stationary secondary jaw 413, and a secondary pivoted jaw 414, is pivotally mounted on a cross pin 404, on which the closing arm is mounted and around which the coil springs 405 extend. This secondary jaw is acted upon by an arm 415 at one end of each of the springs 405 engaging projections 414a of the secondary pivoted jaw, while the actuating arms 405c at the other ends of said springs engage the under face of the closing arm. The springs thus actuate the jaws 402 through the closing arm and also actuate the secondary jaw 414. The secondary jaw 414 is provided with an auxiliary trigger mechanism comprising the arm or lever 416 which is pivotally secured to the outer end of the base plate 401. The main jaws 402 are secured in set position by the pivoted latch 408 which engages the trigger portion 407a of the pan 407 as previously described with reference to Figs. 1 and 2 for example. The trigger portion 407a is shown in Fig. 10 as being provided with a sighting notch or aperture 407b for enabling the operator to determine the position of the inner edge of the latch 408 in setting the trap, but this forms no part of my present invention, as the same is covered by an application of John U. Lehn, filed September 23, 1939, and given Serial No. 296,229.

In setting the trap having the two sets of jaws, illustrated in Figs. 10 and 11, the auxiliary jaw 414 is first set and secured in set position by placing the latch 416 over it and engaging it temporarily with a notch 416a (see Fig. 11) in the adjacent upturned portion 401a of the base. The main jaws are then set and the latch 408 is placed over one of the main jaws 402 and the auxiliary jaw 414, as shown in Fig. 10, and the end of the latch 408 is engaged with the trigger portion 407a of the tripping device or pan 407, after which the latch 416 is removed from the notch 416a, and placed in charge of the adjacent main jaw 402 as shown in Fig. 10.

When the trap is sprung, the closing arm will rise and effect the closing of the main jaws, and the curved portions 411 and 410a of the closing aperture and its flanges will be brought into contact with the upper and outer corner portions of the jaws, if the jaws are permitted to meet, thus shifting the direction of pressure of the closing arm on each of the main jaws from directly opposite lateral directions to opposite inwardly inclined directions with the angle of inclination less than 180° the one from the other, so as to prevent jamming of the closing arm and the main jaws as previously described. It will also be seen that, as the main jaws are raised by the closing arm into or toward closed position when the trap is sprung, the auxiliary trigger lever 416 will be released and fly upward, thereby releasing the secondary pivoted jaw 414, which will be actuated by the spring 405 to move it through an arc of approximately 180°, during the latter portion of which it will clamp the body of the animal between it and the stationary jaw 413.

It will be understood that while the main jaws of the trap are ordinarily and preferably made in curved form, the invention is equally applicable to a form of trap in which the jaws are made with the portions adjacent to the pivots at an angle or perpendicular to the central portion, in which case the operation of the trap would be exactly as hereinbefore described. In such a construction the portions of the jaws adjacent to the pivots would extend outside of the arc of travel of the jaw engaging portions of the arm and effect the same result as where the jaws are curved eccentrically to the axis of the arm.

What I claim and desire to secure by Letters Patent is:

1. A trap having a base, a pair of opposed curved jaws pivoted thereto, and a spring actuated closing arm pivoted to the base at a point eccentric with respect to the adjacent curved portions of the jaws, said arm having a closing aperture the lateral edges of which engage the outer lateral faces of the jaws during the closing of the jaws, and exert pressure in opposite directions on said jaws substantially parallel to the axis of the closing arm, as the jaws approach closed position, the edges of said aperture having inwardly extending portions for engaging the jaws when the latter are in completely closed position to shift the directions in which the pressure of said arm is applied to the jaws toward planes perpendicular to the axis of said arm and prevent jamming of the engaged surfaces of the closing arm and jaws.

2. A trap having a base, a pair of opposed curved jaws pivoted thereto, and a spring actuated closing arm pivoted to the base at a point eccentric with respect to the adjacent curved portions of the jaws, said arm having a closing aperture, the lateral edges of which engage the outer lateral faces of the jaws during the closing of the jaws, and exert pressure in opposite directions on said jaws substantially parallel to the axis of the closing arm as the jaws approach closed position, the edges of said aperture having inwardly extending portions for engaging the jaws when the latter are in completely closed position to shift the directions in which the pressure of said arm is applied to the jaws, toward planes perpendicular to the axis of said arm and prevent jamming of the engaged surfaces of the closing arm and jaws, said aperture being of such width as to provide clearance between the outer lateral faces of the jaws and the lateral opposed edges of the closing aperture when the jaws are in closed position.

3. A trap having a base, a pair of opposed curved jaws pivoted thereto, and a spring actuated closing arm pivoted to the base at a point eccentric with respect to the adjacent curved portions of the jaws, said arm having a closing aperture, the lateral edges of which engage the outer lateral faces of the jaws during the closing of the jaws, and exert pressure in opposite directions on said jaws, substantially parallel to the axis of the closing arm as the jaws approach closed position, the edges of said aperture having substantially parallel opposed portions and inwardly curved portions at the outer end of said aperture for engaging the jaws when the latter are in completely closed position to shift the pressure of the closing arm upon said jaws, toward planes perpendicular to the axis of the closing arm, the width of said aperture between the substantially parallel edges thereof being greater than the combined width of the jaws, at the point where they engage said inwardly curved portions of said aperture.

4. In a trap, the combination with a base and a pair of opposed pivotally mounted jaws having curved portions of a spring actuated closing arm pivoted to the base eccentrically with respect to the curved portions of the jaws, and provided with a closing aperture having substantially parallel lateral edges which engage the outer lateral faces of said jaws and apply pressure thereto in opposite directions substantially parallel to the axis of the closing arm when the jaws approach a vertical position, the edges of said closing aperture engaged by said jaws having inwardly curved portions for engaging the upper and outer corners of the respective jaws when the jaws are brought into close proximity to apply pressure to the jaws in opposite directions inclined to the axis of the closing arm, the width of said closing aperture between the substantially parallel portions being greater than the combined widths of said jaws at the points where they are engaged by said inwardly curved portions, whereby jamming is prevented in the closed position of the trap between the closing arm and jaws.

5. In a trap, the combination with a base and a pair of opposed pivotally mounted jaws, having curved portions of a spring actuated closing arm pivoted to the base eccentrically with respect to the curved portions of the jaws and provided with a closing aperture for engaging the edges of said jaws, the opposite parallel lateral edges of the said closing aperture being provided with longitudinal flanges, the inner faces of which engage the outer edges of the jaws and apply pressure thereto in opposite directions substantially parallel to the axis of the closing arm when the jaws approach vertical positions, said flanges adjacent to the outer end of said aperture having inwardly curved portions integral with and connecting the ends of said flanges and the adjacent plane portion of the closing arm to reinforce said flanges, and to engage the outer and upper corners of the jaws when in closed position to apply pressure to the jaws in opposite directions inclined to the axis of the closing arm, the distance between the parallel portions of said flanges being greater than the combined widths of said jaws at the points engaged by the closing arm when the jaws are in closed position.

6. In a trap, the combination with a base and a pair of opposed pivotally mounted jaws having curved portions of a spring actuated closing arm pivoted to the base eccentrically with respect to the curved portions of the jaws and provided with a closing aperture for engaging the outer edges of said jaws and applying pressure thereto in opposite directions substantially parallel to the axis of the closing arm when the jaws approach vertical positions, the opposite lateral edges of the said closing aperture being provided with longitudinal parallel flanges, the inner faces of which engage the outer edges of the jaws, said flanges adjacent to the outer end of said aperture having inwardly curved portions integral with and connecting the ends of said flanges, and the adjacent plane portion of the closing arm to reinforce said flanges, and to engage the outer and upper corners of the jaws when the latter are closed, to apply pressure to the jaws in opposite directions inclined to the axis of the closing arm, the width of said aperture between the parallel portions of said flanges being greater than the combined widths of said jaws, at the points engaged by the closing arm when the jaws are closed, to prevent jamming, the outer end edge of said closing aperture being provided with a transverse stop for engaging the outer faces of said jaws.

7. In a trap, the combination with a base and a pair of opposed pivotally mounted jaws having curved portions adjacent to their pivots, and a spring actuated closing arm pivoted to the base at a point eccentric with respect to the adjacent curved portions of the jaws, said arm having a closing aperture, the opposite lateral edges of the aperture engaging and applying pressure to the outer lateral faces of the jaws in opposite directions at an angle of substantially 180° to one another as the jaws approach closed position, the edges of said aperture having inwardly extending portions for engaging the jaws when the latter are in completely closed position and applying pressure thereto in opposite directions at an angle less than 180° the one to the other when the jaws are in completely closed position.

8. A trap having a base, a pair of opposed jaws, and a spring actuated closing arm embracing the jaws and pivotally mounted intermediate the jaw pivots, the portions of the jaws adjacent to their pivots and engaged by said arm extending out of alignment with the arc of travel of the jaw engaging portions of said arm, said arm having a closing aperture, the lateral edges of which engage the outer lateral faces of the jaws during the closing movement thereof and exert pressure in opposite directions on said jaws substantially parallel to the axis of the closing arm as the jaws approach closing position, the edges of said aperture having inwardly extending portions for engaging the jaws when the latter are in completely closed position to shift the directions in which the pressure of said arm is applied to the jaws toward planes perpendicular to the axis of said arm and prevent jamming of the engaged surfaces of the closing arm and jaws.

9. A trap having a base, a pair of opposed jaws, a pivoted, spring-actuated closing arm embracing the jaws, and traveling in an arc which is out of alignment with that portion of the jaws engaged by the closing arm throughout its range of movement, said closing arm having an aperture, the lateral edges of which engage the jaws during the closing movement, said lateral edges having portions extending inwardly for applying pressure to said jaws in opposite directions at an angle less than 180° the one to the other, when the jaws are in completely closed position.

HERSHEY ROY GRAYBILL.